United States Patent Office 3,767,763
Patented Oct. 23, 1973

3,767,763
SEPARATION OF SODIUM COMPOUNDS
William M. Bunting, Baton Rouge, La., and Arthur M. Langer, Jr., Watchung, N.J., assignors to Esso Research and Engineering Company
No Drawing. Continuation-in-part of applications Ser. No. 15,286, Feb. 27, 1970, and Ser. No. 58,660, July 27, 1970. This application Nov. 26, 1971, Ser. No. 202,646
Int. Cl. C01d 3/16
U.S. Cl. 423—194                8 Claims

ABSTRACT OF THE DISCLOSURE

This invention relates to the use of aliphatic tertiary chelating polyamines for separating sodium compounds from either themselves or from potassium salts, rubidium salts, cesium salts, lithium salts having a lattice energy greater than about 220±10 kcal./mole or from Group II-A metal salts.

---

This application is a continuation-in-part of copending application bearing Ser. No. 58,660 filed on July 27, 1970 and Ser. No. 15,286 filed on Feb. 27, 1970.

This invention relates to a method for separating sodium compounds from themselves as well as from potassium salts, rubidium salts, cesium salts, lithium salts having a lattice energy greater than about 220±10 kcal./mole (about the lattice energy of lithium hydride or from Group II-A metal salts).

In another aspect, this invention relates to a method for separating and purifying organosodium compounds from organic or inorganic impurities.

In this invention, certain chelating agents are employed to separate inorganic sodium salts from one another and from other salts or impurities including other Group I-A and Group II-A inorganic salts. For example, a mixture of crystalline sodium chloride and sodium iodide may be contacted with a chelating agent such as pentamethyldiethylenetriamines in benzene and a benzene soluble pentamethyldiethylenetriamine-sodium iodide complex will form leaving the sodium chloride behind. The pure sodium iodide can then be recovered by heating the filtered solution to 75° C. which destabilizes the complex and precipitates sodium iodide. A similar procedure can be followed to separate a salt such as sodium iodide from another Group I-A or II-A salt or salt mixture, such as for example, a mixture of sodium iodide, potassium iodide and barium chloride.

The inorganic sodium salt and a chelating agent can be readily obtained from the complex by appropriate destabilization of the complex, that is by heating, by addition of aqueous or anhydrous acids or bases (e.g., HCl, $H_2SO_4$, NaOH, diglyme, KOH, etc.), vacuum stripping, solvent extraction, etc. Separation of the chelating agent from the sodium salt is done preferably by heating, solvent extraction or vacuum stripping since both components are recovered pure by this procedure without consuming additional chemicals.

The purification and/or separation processes briefly described above may, of course, be advantageously utilized with column and counterflow techniques. That is, the inorganic sodium salt mixture (complexed or uncomplexed) may be contacted with a counterflow of a hydrocarbon solution of a chelating agent and the resultant complex may then be subjected to destabilization to recover the desired sodium compound. The chelating agent is recovered separately for recycle.

The chelatable sodium compounds which can be separated by the subject processes are those which have a lattice energy of less than about 180 kilocals. per mole (measured at 18° C.). Mixtures of sodium compounds all of which have lattice energies above 180 kcal./mole are, of course, not separated by the instant invention. Thus, for example, a mixture of $Na_2SO_4$ (lattice energy 485–621 kcal./mole) and NaF (lattice energy 217–220 kcal./mole) cannot be separated by the present invention. However, as long as one sodium salt in a salt mixture has a lattice energy of less than about 180 kcal./mole that component may be separated from the other salt or salts.

Useful inorganic sodium salts include, but are not limited to, those in which the anion is a complex metal anion which may be represented by the formula $R'_nMX_m$ wherein $n$ is an integer of 0 to 6, inclusive, depending on the valence of M, $m$ is an integer and $(n+m-1)$ equals the valence of M, X is a halogen or pseudo-halogen, R' is a $C_1$–$C_{20}$ alkyl, aryl or aralkyl radical and M is a metal selected from the group consisting of beryllium, magnesium, Group I-B elements (i.e. Cu, Ag, Au), Group II-B elements (i.e. Zn, Cd, Hg), Group III elements (i.e. B, Al, Ga), Group IV-A elements other than carbon and silicon, Group V-A elements other than nitrogen (i.e. P, As, Sb, Bi), and the transition metals (i.e. Subgroup B of Groups IV through VIII (i.e. Fe, Co, Ni, Ti, Zr, V, Cr, Mn). The Periodic Table employed in describing this invention is that which appears on the back cover of "Handbook of Chemistry and Physics" (Chemical Rubber Co., 49th Ed.).

Nonlimiting examples of useful anions include the hydridoaluminates, the hydridoborates, the chloroaluminates (tetra-, hepta-, etc.), the aluminum and boron alkyl halides, the aluminum and boron tetra-alkyls and -aryls, $AuBr_4^-$, $BF_4^-$, $PF_6^-$, $FeCl_4^-$, $Cr(CO)_5I^-$, $W(CO)_5Br^-$, $MnCl_3^-$, $VF_6^-$, $HgCl_3^-$, $B_2H_7^-$, $UF_4^-$, $AsF_6^-$, $ClO_4^-$, $SCN^-$, $I^-$, $Br^-$, $N_3^-$, $NO_3^-$, $O\text{-}t\text{-}Bu^-$, $NMe_2^-$, $S\phi^-$.

Preferably, the inorganic sodium salt is one of the following: NaBr, NaI, $NaN_3$, $NaBH_4$, $NaB_2H_7$, $NaAlH_4$, $NaNO_3$, $NaClO_4$, $NaBF_4$, NaSCN, $NaNMe_2$, NaO-t-Bu, $NaS\phi$, $NaAlEt_4$, $NaBBu_4$, $NaBHEt_3$, $NaAlH_2Et_2$, $NaAlH_3O\phi$, $NaPF_6$, $NaFeCl_4$, $NaCr(CO)_5I$ The organosodiums useful in this invention have the formula R'Na, wherein R' is a hydrocarbon radical derived from hydrocarbon RH having at least one replaceable hydrogen with a $pK_a$ less than about 38. Compounds having $pK_a$'s above this upper limit produce RNa compounds which could lead to rapid decomposition of the complex via metalation of the chelating agents. The $pK_a$ limit is based on the MSAD acidity scale (Donald J. Cram, "Fundamentals of Carbanion Chemistry," Academic Press, New York, 1965, p. 19). Preferably, R' will be selected from the group consisting of aryl, arylmethyl, alkaryl and allylic radicals. The most preferable R' groups include benzyl, phenyl, allyl, diphenylmethyl, triphenylmethyl, fluorenyl, naphthyl, cyclopentadienyl, octenyl, etc.

The chelating agent of the present invention must be aliphatic or cycloaliphatic and contain at least three functional groups; said functional groups being spatially related to one another in such manner as to allow formation of a stable chelate with the sodium atom of the inorganic sodium salt. The functional groups may be either of two types. The first type is selected from the group consisting of a secondary amine group and a tertiary amine group; the second type is selected from the group consisting of a secondary amine group, a tertiary amine group, and an ether group. In other words, the chelating agent must be an aliphatic or cycloaliphatic chelating polyamine or aminoether.

Attempted separations of sodium iodide from sodium cholride using two of the better bidentate chelating agents, cis - N,N,N',N' - tetramethylcyclohexanediamine (cis-TMCHD) and sparteine, were unsuccessful. Thus, bidentate chelating agents are inoperative for separating mixtures of sodium salts and are outside the scope of the present invention.

The chelating agent may be a tris-(2-dimethylaminoethyl)-amine as well as those compounds falling within the scope of the following general formula:

(I) 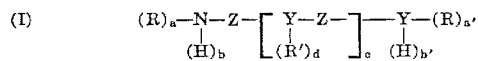

wherein $a$ is 1 or 2, $b$ is 0 or 1, and $a+b=2$; $c$ is an integer of 1 to 10,000, inclusive; $d$ is 0 or 1, depending on the valence of Y; $a'$ is 1 or 2, $b'=0$ or 1 and $a'+b'=1$ or 2, depending on the valence of Y; R is the same or different $C_1$–$C_4$ alkyl radical; R' is hydrogen or is the same or different $C_1$–$C_4$ alkyl radical or $C_6$–$C_{10}$ aryl or aralkyl radical; Y is a nitrogen or oxygen atom; and Z is a nonreactive radical selected from the group consisting of (1) $C_4$–$C_{10}$ cycloaliphatic radicals wherein said radicals are attached to the nitrogen and Y atoms in Formula I at 1,2 or 1,3' positions on the cycloaliphatic rings; and (2) 1 to 4 methylenic radicals wherein each methylenic radical contains 0 to 2 monovalent hydrocarbon radicals of 1 to 6 carbon atoms.

Suitable nonlimiting examples of chelating agents falling within the scope of the above formulas are: N,N,N',N'',N'' - pentamethyl - diethylene - triamine (PMDT); N,N,N',N'',N''', N''' - hexamethyltriethylenetetramine (HMTT); tris - (2 - dimethylaminoethyl) amine(iso - HMTT); octamethylpentaethylenehexamine (OMPH); heptamethyltetraethylenepentamine (HMTP); N-(2 - dimethylaminoethyl),N,N',N' - trimethylcyclohexane-1,2-diamine; methyl di - (2 - dimethylaminopropyl)-amine; poly-(N - ethyl - ethyleneimine); poly-(N-methyl ethyleneimine); bis-(2-dimethylamino)ethyl ether.

Preferred chelating agents include tris-(2-dimethylaminoethyl)-amine and tertiary polyamine compounds falling within the scope of Formula I above. Particularly preferred species of the chelating tertiary polyamines are PMDT, HMTT, iso-HMTT, HMTP, OMPH, poly-(N-methylethyleneimine), etc. Particularly preferred species of the aminoethers are bis-(2-dimethylamino)ethyl ether, tris-(2-methoxyethyl)amine, etc.

For separations involving reactive organosodium compounds, the chelating agents are limited to tris-(2-dimethylaminoethyl)amine and tertiary chelating polyamines falling within the scope of Formula II:

(II) 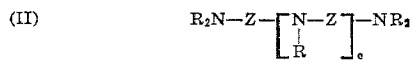

wherein R, c and Z are defined as above. Secondary amino groups, ether groups and aryl groups are generally unsatisfactory in chelates with organosodiums because of rapid metalation. The particularly preferred tertiary chelating polyamines are the same as listed above for use with inorganic sodium compounds.

Not all inorganic sodium compounds form complexes with the above-described chelating agents. It is, however, now possible to relate success in chelating inorganic sodium compounds to the lattice energy of the unchelated sodium compounds and to find an approximate cutoff lattice energy above which chelation does not occur. This cutoff lattice energy has been experimentally determined to be about 180 kcal./mole. Since the ability to form chelates is obviously dependent on the chelating agent employed, this cutoff lattice energy is also chelating agent dependent; i.e. only chelating agents capable of forming the most stable complexes will chelate sodium salts having lattice energies in the area of 180 kcal./mole.

The chelated sodium compounds decompose upon heating to give the unchelated inorganic sodium compound as a precipitate and free chelating agent in solution. Upon cooling, this reaction is reversible. The temperature at which the uncomplexed salt precipitates is quite sharp (1–2°) and reproducible at a given concentration. Using this information, it was possible to determine the relative thermal stabilities of the chelated sodium compounds.

Table I, below, contains decomposition temperatures for a variety of chelated sodium compounds. These temperatures were obtained by synthesizing the chelated sodium compound in benzene, filtering the reaction to give a clear solution, and heating the solution in an oil bath at the rate of about 1° C./min. The temperature at which salt precipitates was taken as the decomposition temperature.

TABLE I

Chelate decomposition temperatures

| | Temp., ° C. |
|---|---|
| $NaBH_4$: | |
| PMDT | 45 |
| HMTT | 45–46 |
| iso-HMTT | 56–58 |
| HMTP | 50–51 |
| NaI: | |
| PMDT | 56 |
| HMTT | 56 |
| HMTP | 72 |
| OMPH | 60–69 |
| NaOtBu: | |
| HMTT | 65 |
| PMDT | >85 |

From this information it can be seen that the thermal stabilities of the chelated sodium compounds are chelating agent dependent; e.g. chelates of iso-HMTT are more stable than those of HMTT, which are more stable than those of PMDT. This same order can be seen for the cutoff lattice energy which, as already stated, is also chelating agent dependent. Table II, below, lists some inorganic sodium compounds in order of increasing lattice energy and the results of attempts to chelate these compounds with iso-HMTT, HMTT and PMDT.

TABLE II.—COMPLEXATION DEPENDS ON LATTICE ENERGY

| Compound | Lattice energy* | Complex formation | | | |
|---|---|---|---|---|---|
| | | HMTT Yes | PMDT No | Iso-HMTT | |
| | | | | Yes | No |
| $NaClO_4$ | 159–175 | X | | | |
| NaSCN | 163–178 | X | | | |
| NaI | 164–166 | X | | | |
| $NaBH_4$ | 168 | X | | X | |
| $NaN_3$ | 169–175 | | X | X | |
| $NaNO_3$ | 173–181 | | X | X | |
| NaBr | 176–178 | | X | X | |
| NaCN | 177–185 | | X | | X |
| NaOAc | 182–198 | | X | | |
| NaCl | 185–186 | | X | | |
| $NaNO_2$ | 185–201 | | X | | |
| NaH | 193–202 | | X | | |
| NaOH | 211 | | X | | |

*Several authors as compiled in M. F. C. Ladd and W. H. Lee in H. Reiss, ed., Progr. Solid State Chem., vol. I, Pergamon Press, London, 1964.

The complex of the inorganic sodium salt may be readily prepared by mixing the selected inorganic sodium salt (having the requisite maximum lattice energy) with the selected chelating agent in the absence of solvent. Such mixing may also be accomplished in the presence of inert hydrocarbons, e.g. $C_4$–$C_{20}$ alkanes (e.g. pentane, heptane, hexadecane); $C_6$–$C_{20}$ aromatics (e.g. benzene, toluene, xylene, dibutylnaphthalene); halogenated aliphatics and aromatics (e.g. chlorobenzene, dichlorobenzene, hexafluorobenzene); heterocyclic compounds (e.g. pyridine, pyrrole, furan, thiophene, sulfolane, borazole); polar solvents (e.g. ketones, dimethylsulfoxide, acetonitrile, dimethylformamide, liquid ammonia, triethylamine, propylene carbonate, ethers, etc.); or mixtures thereof.

The amount of the diluent is not critical and amounts in the range of 0 to 99.9 wt. percent, based on the chelated sodium salt may be conveniently employed. Thus, the chelate may be formed in the absence of solvents, in the form of pastes and in solutions.

In those situations where the inorganic sodium salt of choice is not solubilized by the admixture of the chelating agent and solvent, the chelate may be formed by mixing the inorganic sodium salt (which is preferably in finely divided form) with the chelating agent of choice in stoichiometric amounts, or preferably, with excess chelating agent.

Another method for preparing the chelate involves anion exchange. In this method, the chelating agent of choice is mixed with an inorganic sodium salt (in which the anion is not the desired anion) by one of the methods described above. Thereafter, the resultant chelate is subjected to anion exchange in the presence of a metal salt (or other well known techniques such as anion exchange resins) containing the anion of choice; alternatively, all components may be mixed simultaneously and both chelation and metathesis occurs in situ.

Regardless of the method employed the preparation of the chelate is preferably carried out under anhydrous conditions, although this is not always necessary in salt separations.

The complex may be readily prepared at temperatures from about −100° C. to about 150° C.; preferably 0 to 100° C.; the latter temperature range is preferred because of convenience and also since higher temperature favor dissociation of the less stable complexes. Pressures may range from subatmospheric to 100 p.s.i.g. or more. For convenience sake, atmospheric pressures are preferred.

The molar ratio of the amount of chelating agent employed to the salt mixture depends upon the type of salt mixture to be separated. If there is only one complexable sodium salt in the mixture, the amount of chelating agent used is not critical and from about 0.1 to about 50, preferably 0.8 to 1.2, moles of chelating agent per mole of complexable inorganic sodium salt are employed. When the salt mixture contains more than one complexable sodium salt the amount of chelating agent used is 0.8 to 1.2 moles, preferably 1.0 mole, per mole of the sodium salts can also be separated from mixtures containing non- The lowest lattice energy sodium salt may thereby be separated from the mixture. The remaining salt mixture is then contacted with 0.8 to 1.2 moles, preferably 1.0 mole, of the same or different chelating agent based on the quantity of sodium salt present in the mixture having the second lowest lattice energy. Suitable adjustment of reaction mixture temperature is made if required. The above process is repeated until the sodium salt mixture is completely separated into its individual components or until all complexable sodium salts have been separated from the mixture.

Of course, the minimum amount of chelating agent should be that stoichiometric amount required to produce the desired type of chelate (where more than one type of chelate is possible from a particular inorganic sodium salt and a particular chelating agent). Where only one type of chelate can be formed or where one is not concerned with the particular type of chelate to be formed (assuming that more than one type is possible), it is desirable to employ amounts of chelating agent in excess of the stoichiometric amount.

Mixtures of sodium salts and lithium salts having lattice energies less than 220±10 Kcals/mole are separated by lithium complexation according to a copending application bearing Ser. No. 202,645, now U.S. Pat. 3,755,533, filed on this date in the name of Arthur W. Langer, Jr. and Thomas A. Whitney. In that application, the lithium salts form complexes in preference to the sodium salts. In the present invention, chelatable sodium salts can also be separated from mixtures containing non-chelatable lithium salts (those having lattice energies greater than 220±10 kcals./mole) since the sodium salts will be solubilized by the chelating agents.

Separations involving organosodium compounds are carried out essentially the same as described above for inorganic salts except for precautions and limitations arising from the reactivity and sensitivity of organosodiums. Thus, the solvents must be truly inert to the RNa and will normally be selected from the group consisting of $C_4$–$C_{20}$ alkanes, cycloalkanes or branched alkanes, $C_6$–$C_{20}$ aromatics, and trialkylamines. Also, the temperatures used are preferably from about −50° C. to +50° C. to minimize metalation and other decomposition reactions. Generally, once the pure chelated organosodium complex has been isolated, it is usually desirable to use the complex for reactions rather than recover the free organosodium since the complex is generally more reactive and more soluble.

This invention can be illustrated by the following examples:

EXAMPLE 1

To 0.5 g. of NaI and 0.5 g. NaCl suspended in 25 ml. of benzene was added 2.2 ml. PMDT. The reaction was stirred overnight and filtered to give solid A. Solid A was washed with benzene, dried and analyzed. The filtrate was evaporated under vacuum to give solid B which was analyzed. Calc'd for initial mixture: Cl, 30.5; I, 42.5 . Found for solid A: I, 5.63; Cl, 59.38. Found for solid B: I, 42.73; Cl, 0.00. Calc'd for PMDT·NaI: I, 39.5.

This experiment shows that sodium iodide and sodium chloride can be separated by selective chelation.

EXAMPLE 2

To 0.5 g. sodium iodide and 0.5 g. potassium iodide suspended in 25 ml. benzene was added 2.2 ml. PMDT. The reaction was stirred overnight and filtered to give solid A. Solid A was washed with benzene, dried, and analyzed. The filtrate was evaporated under vacuum to give solid B. Cacl'd for initial mixture: Na, 7.65; K, 11.7. Found for solid A: Na, 0.22; K, 4.73. Found for solid B: Na, 7.01; K, 0.02. This experiment shows that sodium iodide and potassium iodide can be separated by selective chelation.

EXAMPLE 3

Organosodium compounds are extremely difficult to obtain in pure form due to insolubility in inert solvents and high reactivity with other solvents. PMDT·NaBz was prepared from commercial (Orgmet) benzylsodium. The commercial benzylsodium and the PMDT·benzylsodium were analyzed. Calc'd for benzylsodium: C, 73.7; H, 6.13. Found for benzylsodium: C, 42.44; H, 3.57. Calc'd for PMDT-benzylsodium: C, 67.0; H, 10.45; N, 14.6. Found for PMDT-benzylsodium: C, 65.54; H, 10.38; N, 14.61. This experiment shows that pure organosodium compounds can be prepared by chelation.

EXAMPLE 4

To 0.75 g. sodium iodide (5 mmoles) and 0.60 g. sodium perchlorate (5 mmoles) suspended in 25 ml. benzene was added 0.87 g. (5 mmoles) PMDT. The reaction was stirred two hours and filtered to give solid A (0.88 g.). Solid A was washed with benzene, dried, and analyzed. The filtrate was evaporated under vacuum to give solid B. Calc'd for initial mixture: Cl, 12.9; I, 47.0. Percent I/percent Cl: 3.64. Found for solid A: Cl, 6.52; I, 57.02. Percent I/percent Cl: 8.8. Found for solid B: Cl, 8.73; I, 10.53. Percent I/percent Cl: 1.2.

This experiment shows that two sodium compounds forming relatively stable amine chelates can be partially separated in one stage by the difference in stability of their complexes. Therefore, the use of additional chelating stages should allow complete separation of quite similar sodium salts.

EXAMPLE 5

To 0.12 g. (3 mmoles) sodium borohydride and 0.45 g. sodium iodide (3 mmoles) were added 1.3 ml. (6 mmoles) PMDT and 7 ml. benzene. The solution was heated to 60° and filtered. Infrared showed a marked decrease in the B-H band in the filtrate compared with the original solution. The filtrate was evaporated to give 1.08 g. solid (theoretical yield of PMDT·NaI is 0.97 g.).

This experiment is qualitative rather than quantitative, but still shows that sodium borohydride and sodium iodide

EXAMPLE 6

To a one oz. bottle was added 0.117 g. (2 mmoles) of NaCl, 0.299 g. (2 mmoles) of NaI, 10 ml. of benzene and 0.618 g. (4 mmoles) of cis-TMCHD. The mixture was shaken at room temperature on a mechanical shaker for one hour, filtered and the filtrate was evaporated with heating under vacuum. Only a trace of residue remained. Thus, no significant complex of cis-TMCHD and NaI formed.

EXAMPLE 7

Using the same procedure as Example 6, but employing sparteine as the complexing agent, separation of NaI from NaCl was attempted. Virtually no residue remained upon evaporation of the filtrate. Thus, no complex of sparteine and NaI formed. Similar results are obtained using N,N,N',N'-tetramethylethylenediamine (TMED). The results of Examples 6 and 7 demonstrate that bidentate chelating agents are not strong enough complexing agents to form stable complexes with inorganic sodium compounds and therefore, cannot be used to separate mixtures of sodium salt.

EXAMPLE 8

$Li_2SO_4$, 2.20 g. (20 mmole), 6.60 g. NaI (44 mmole), 6.01 g. $MgSO_4$ (49.9 mmole) and 5.59 g. $CaCl_2$ (50.4 mmole) are suspended in 200 ml. benzene and 9.22 g. (40 mmole) n-HMTT are added. The mixture is stirred for 6 hours and filtered. The residue is washed with benzene and the filtrates are evaporated, yielding n-HMTT·NaI. The complex is then separated into its components by extraction n-HMTT with boiling heptane, leaving pure NaI solid. $Li_2SO_4$ has a lattice energy greater than 200 kcals./mole and does not complex with chelating tertiary amines.

EXAMPLE 9

Phenylsodium, 10 g. (100 mmoles), contaminated with 1.03 g. (10 mmoles) sodium bromide, is slurried in 250 ml. benzene and 17.3 g. (100 mmoles) PMDT is added. After stirring 3 hours, the mixture is filtered to remove NaBr. The filtrate contains pure PMDT·Naφ which may be used as such or vacuum stripped without heating to recover the pure crystalline complex.

What is claimed is:

1. A process for separating sodium compounds from a mixture consisting either of other sodium compounds or other metal compounds selected from the group consisting of lithium compounds having a lattice energy greater than about 220±10 kcals./mole, potassium compounds, rubidium compounds, cesium compounds, and Group II metal compounds, said process comprising the steps of:
   (1) adding to said mixture a chelating agent selected from the group consisting of tris(2-dimethylaminoethyl) amine and those compounds having the formula:

(I) 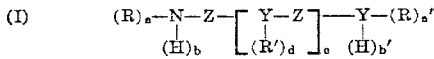

wherein $a$ is 1 or 2, $b$ is 0 or 1, and $a+b=2$; $c$ is an integer of 1 to 10,000, inclusive; $d$ is 0 or 1, depending on the valence of Y; $a'$ is 1 or 2, $b'=0$ or 1 and $a'+b'=1$ or 2, depending on the valence of Y; R is the same or different $C_1$–$C_4$ alkyl radical; R' is hydrogen or is the same or different $C_1$–$C_4$ alkyl radical or $C_6$–$C_{10}$ aryl or aralkyl radical; Y is a nitrogen or oxygen atom; and Z is a nonreactive radical selected from the group consisting of
   (i) $C_4$–$C_{10}$ cycloaliphatic radicals wherein said radicals are attached to the nitrogen and Y atoms in Formula I at 1,2 or 1,3 positions on the cycloaliphatic rings;
   (ii) 1 to 4 methylenic radicals wherein each methylenic radical contains 0 to 2 monovalent hydrocarbon radicals of 1 to 6 carbon atoms;
   (2) isolating the complex resulting in Step 1 and leaving behind an effluent;
   (3) successively repeating Steps 1 and 2 until (a) the complex which results is that of the desired metal compound, or (b) the effluent comprises substantially a single uncomplexed metal compound and
   (4) recovering the desired compound by destabilization of the complex.

2. A process according to claim 1 in which the anion of the sodium compound is selected from the group consisting of bromide, iodide, nitrate, hexafluorophosphate, borohydride, aluminum hydride, tetraethylaluminate, tetrafluoroborate, tetraphenylborate, prechlorate, azide, hexafluoroarsenate, tetrafluoroberyllate, thiocyanate, dimethylamide and t-butoxide.

3. A process according to claim 1 in which the chelating agent is selected from the group consisting of tris-(2-dimethylaminoethyl) amine and tertiary polyamine compounds falling within the scope of Formula I.

4. A process for separating and purifying organo-sodium compounds having the formula R'Na from a mixture containing organic or inorganic impurities, said process comprising the steps of
   (1) adding to said mixture a chelating agent selected from the group consisting of tris-(2-dimethylaminoethyl) amine and those compounds having the formula:

(II) 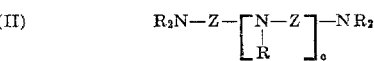

wherein R, c and Z are the same as defined in Formula I, and R' is a radical derived from a hydrocarbon having a pKa less than 38;
   (2) isolating the soluble complex resulting in Step 1 and leaving behind an effluent.

5. A process according to claim 4 in which R' is a radical selected from the group consisting of benzyl, phenyl, allyl, diphenylmethyl, triphenylmethyl, fluorenyl and cyclopentadienyl.

6. A process according to claim 4 further including the step of recovering the organosodium compound by destabilization of the complex.

7. A process according to claim 1 for separating a mixture of sodium bromide and phenyl sodium, said process comprising the steps of adding N,N,N',N'',N''-pentamethyldiethylenetriamine to said mixture and isolating N,N,N',N'',N'' - pentamethyldiethylenetriamine⊛sodium phenyl complex from said sodium bromide.

8. A process according to claim 1 for separating a mixture of sodium iodide and sodium chloride, said process comprising the steps of adding N,N,N',N'',N''-pentamethyldiethylenetriamine to said mixture and isolating a solid complex of N,N,N',N'',N''-pentamethyldiethylenetriamine⊛sodium iodide from the uncomplexed sodium chloride.

References Cited
UNITED STATES PATENTS 3,541,149  1/1970  Langer _____ 260—583 P

OTHER REFERENCES

Marullo et al., J. Am. Chem. Soc. 88 (1966), p. 1076–7.

DANIEL E. WYMAN, Primary Examiner

A. P. DEMERS, Assistant Examiner

U.S. Cl. X.R.

23—300; 260—448 H, 563, 583 P, 583 R, 665 R; 423—179, 184, 195, 196, 206, 499